US012506264B2

(12) United States Patent
Wu et al.

(10) Patent No.: US 12,506,264 B2
(45) Date of Patent: Dec. 23, 2025

(54) ANTENNA MODULE AND ELECTRONIC DEVICE

(71) Applicant: PEGATRON CORPORATION, Taipei (TW)

(72) Inventors: Chien-Yi Wu, Taipei (TW); Shih-Keng Huang, Taipei (TW); Chao-Hsu Wu, Taipei (TW); Chih-Wei Liao, Taipei (TW); Sheng-Chin Hsu, Taipei (TW); Hao-Hsiang Yang, Taipei (TW); Tse-Hsuan Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 175 days.

(21) Appl. No.: 18/462,099

(22) Filed: Sep. 6, 2023

(65) Prior Publication Data

US 2024/0145919 A1 May 2, 2024

(30) Foreign Application Priority Data

Nov. 2, 2022 (TW) .................................. 111141799

(51) Int. Cl.
*H01Q 5/40* (2015.01)
*H01Q 1/02* (2006.01)
(Continued)

(52) U.S. Cl.
CPC ................. *H01Q 5/40* (2015.01); *H01Q 1/02* (2013.01); *H01Q 1/2266* (2013.01); *H01Q 1/48* (2013.01); *H01Q 9/0407* (2013.01)

(58) Field of Classification Search
CPC ........ H01Q 1/242; H01Q 1/2258; H01Q 1/50; H01Q 1/2266; H01Q 5/40; H01Q 5/307;
(Continued)

(56) References Cited

U.S. PATENT DOCUMENTS 10,879,589 B2 * 12/2020 Lim ........................ H01Q 13/10
11,532,871 B2 * 12/2022 Zhou ...................... H01Q 1/243
(Continued)

FOREIGN PATENT DOCUMENTS

TW 201824648 7/2018
TW I645616 12/2018
(Continued)

OTHER PUBLICATIONS

TW 202121738A (Year: 2021).*
TW-202121738-A Translation (Year: 2021).*

*Primary Examiner* — Dameon E Levi
*Assistant Examiner* — Gurbir Singh
(74) *Attorney, Agent, or Firm* — J.C. PATENTS

(57) ABSTRACT

An antenna module includes a first metal plate and a frame body. The frame body surrounds the first metal plate. The frame body includes a first antenna radiator, a second antenna radiator, a third antenna radiator, a first breakpoint and a second breakpoint. The first antenna radiator includes a first feeding end and excites a first frequency band. The second antenna radiator includes a second feeding end and excites a second frequency band. The third antenna radiator includes a third feeding end and excites a third frequency band. The first breakpoint is located between the first antenna radiator and the second antenna radiator. The second breakpoint is located between the second antenna radiator and the third antenna radiator. An electronic device including the above-mentioned antenna module is also provided.

14 Claims, 7 Drawing Sheets

(51) Int. Cl.
*H01Q 1/22* (2006.01)
*H01Q 1/48* (2006.01)
*H01Q 9/04* (2006.01)

(58) Field of Classification Search
CPC H01Q 5/35; H01Q 5/328; H01Q 9/42; H01Q 25/00; H01Q 21/28; H01Q 1/02; H01Q 1/48; H01Q 9/0407; H01Q 1/36; H01Q 1/22; H01Q 1/243
See application file for complete search history.

(56) References Cited

U.S. PATENT DOCUMENTS

| | | | | |
|---|---|---|---|---|
| 2015/0372372 | A1 | 12/2015 | Lee et al. | |
| 2020/0235465 | A1* | 7/2020 | Yang | H01Q 9/42 |
| 2023/0352852 | A1* | 11/2023 | Wu | H01Q 1/241 |

FOREIGN PATENT DOCUMENTS

| | | | | |
|---|---|---|---|---|
| TW | 201929319 | | 7/2019 | |
| TW | 202121738 A | * | 6/2021 | H01Q 5/28 |

* cited by examiner

ANTENNA MODULE AND ELECTRONIC DEVICE

CROSS-REFERENCE TO RELATED APPLICATION

This application claims the priority benefit of Taiwan application serial no. 111141799 filed on Nov. 2, 2022. The entirety of the above-mentioned patent application is hereby incorporated by reference herein and made a part of this specification.

BACKGROUND

Technical Field

The disclosure relates to an antenna module and an electronic device, and in particular relates to a multi-frequency antenna module and electronic device with the antenna module therefore.

Description of Related Art

Nowadays, many electronic devices adopt an all-metal body or a casing mostly made of metal to enhance the appearance or durability. However, the use of a metal body may make the design threshold of some functional modules (such as antenna modules) more challenging.

For example, the commercially available mini PC is compact and does not take up a lot of space. It is aimed at all-in-one plug-and-play applications (upon connecting the power supply, screen, keyboard, and mouse, one may immediately access the system, and after conducting some configurations, it is ready for use). The models available in the market generally only support WiFi for indoor use, and no built-in 5G Sub-6 and Global Positioning System (GPS) functionalities have been seen yet. If the mobility requirements of wireless communication devices on the application side increase, and there are more outdoor use scenarios, such as configuring a mini PC for use in a car, the demand for 5G Sub-6 and GPS functions arises; in addition, high-mobility laptops naturally require built-in 5G Sub-6 and GPS functions. In addition, if the positions of the antenna structure and the heat dissipation holes are improperly arranged, mutual interference occurs.

Therefore, how to maintain the appearance design of the electronic device and take into account the radiation characteristics that the antenna module may include multiple antennas has become one of the problems to be solved in this field.

SUMMARY

An antenna module with good radiation characteristics is provided in this disclosure.

An electronic device is provided in this disclosure, which includes the antenna module.

The antenna module of the disclosure includes a first metal plate and a frame body. The frame body surrounds the first metal plate, and the frame body includes a first antenna radiator, a second antenna radiator, a third antenna radiator, a first breakpoint, and a second breakpoint. The first antenna radiator includes a first feeding end and excites a first frequency band. The second antenna radiator includes a second feeding end and excites a second frequency band. The third antenna radiator includes a third feeding end and excites a third frequency band. The first breakpoint is located between the first antenna radiator and the second antenna radiator. The second breakpoint is located between the second antenna radiator and the third antenna radiator.

The electronic device of the disclosure includes a first body, a second body, and the antenna module. The antenna module is disposed in the second body.

In an embodiment of the disclosure, the frame body further includes a third breakpoint and a fourth breakpoint. The third antenna radiator has a first part, a second part, and a third part. The third breakpoint is located between the first part and the second part, and the fourth breakpoint is located between the second part and the third part.

In one embodiment of the disclosure, a first slot is between the frame body and the first metal plate, and the first slot communicates with the first breakpoint, the second breakpoint, the third breakpoint, and the fourth breakpoint.

In an embodiment of the disclosure, the first slot and the first breakpoint, the second breakpoint, the third breakpoint, and the fourth breakpoint are all filled with an insulating material.

In an embodiment of the disclosure, the antenna module further includes multiple heat dissipation holes, and the heat dissipation holes are disposed at the insulating material in the first slot.

In an embodiment of the disclosure, the first antenna radiator further includes a first ground end and a second ground end. The first ground end and the second ground end are connected to the first metal plate. The second antenna radiator further includes a third ground end. The third ground end is connected to the first metal plate. The third antenna radiator further includes a fourth ground end, a fifth ground end, and a sixth ground end. The fourth ground end, the fifth ground end, and the sixth ground end are connected to the first metal plate and respectively connected to the first part, the second part, and the third part.

In an embodiment of the disclosure, the first slot has a first slot segment located between the fourth ground end and the fifth ground end and a second slot segment located between the fifth ground end and the sixth ground end. The first slot segment communicates with the third breakpoint, and the second slot segment communicates with the fourth breakpoint to form two inverted T-shaped slots.

In an embodiment of the disclosure, the first slot further has a third slot segment located between the first ground end and the fourth ground end, and the third slot segment communicates with the first breakpoint.

In an embodiment of the disclosure, the first antenna radiator, the second antenna radiator, and the third antenna radiator are arranged in sequence to form an L-shaped frame.

In an embodiment of the disclosure, the antenna module further includes a second metal plate, the frame body is located between the first metal plate and the second metal plate, and a second slot is between the second metal plate and the frame body.

In an embodiment of the disclosure, the antenna module further includes a metal retaining wall structure, the metal retaining wall structure is located between the first metal plate and the second metal plate, extends along an extending direction of the first antenna radiator, the second antenna radiator, and the third antenna radiator, and maintains a distance from the first antenna radiator, the second antenna radiator, and the third antenna radiator.

In an embodiment of the disclosure, the first body includes a screen. The second body includes an input module.

In an embodiment of the disclosure, the input module is disposed on the second metal plate.

Based on the above, in the antenna module of the disclosure, under the condition of combining the metal frame with multiple breakpoints, in conjunction with an environment covered with top and bottom metals, the performance of multiple antennas in different frequency bands is improved, and multiple multi-band antenna characteristics are achieved.

In order to make the above-mentioned features and advantages of the disclosure comprehensible, embodiments accompanied with drawings are described in detail below.

DETAILED DESCRIPTION OF DISCLOSED EMBODIMENTS

Figure 1:
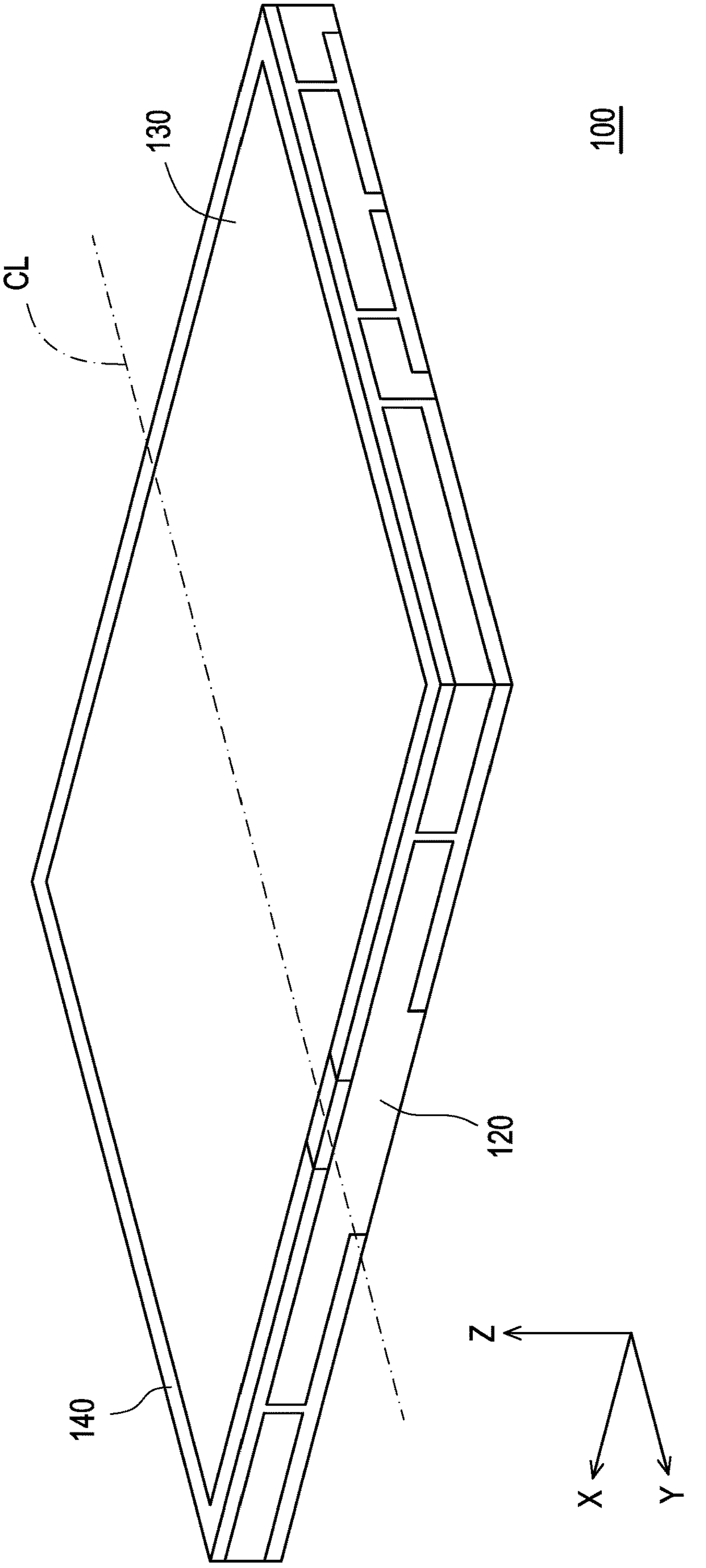
FIG. 1 is a three dimensional schematic diagram of an antenna module according to an embodiment of the disclosure.
Figure 2:
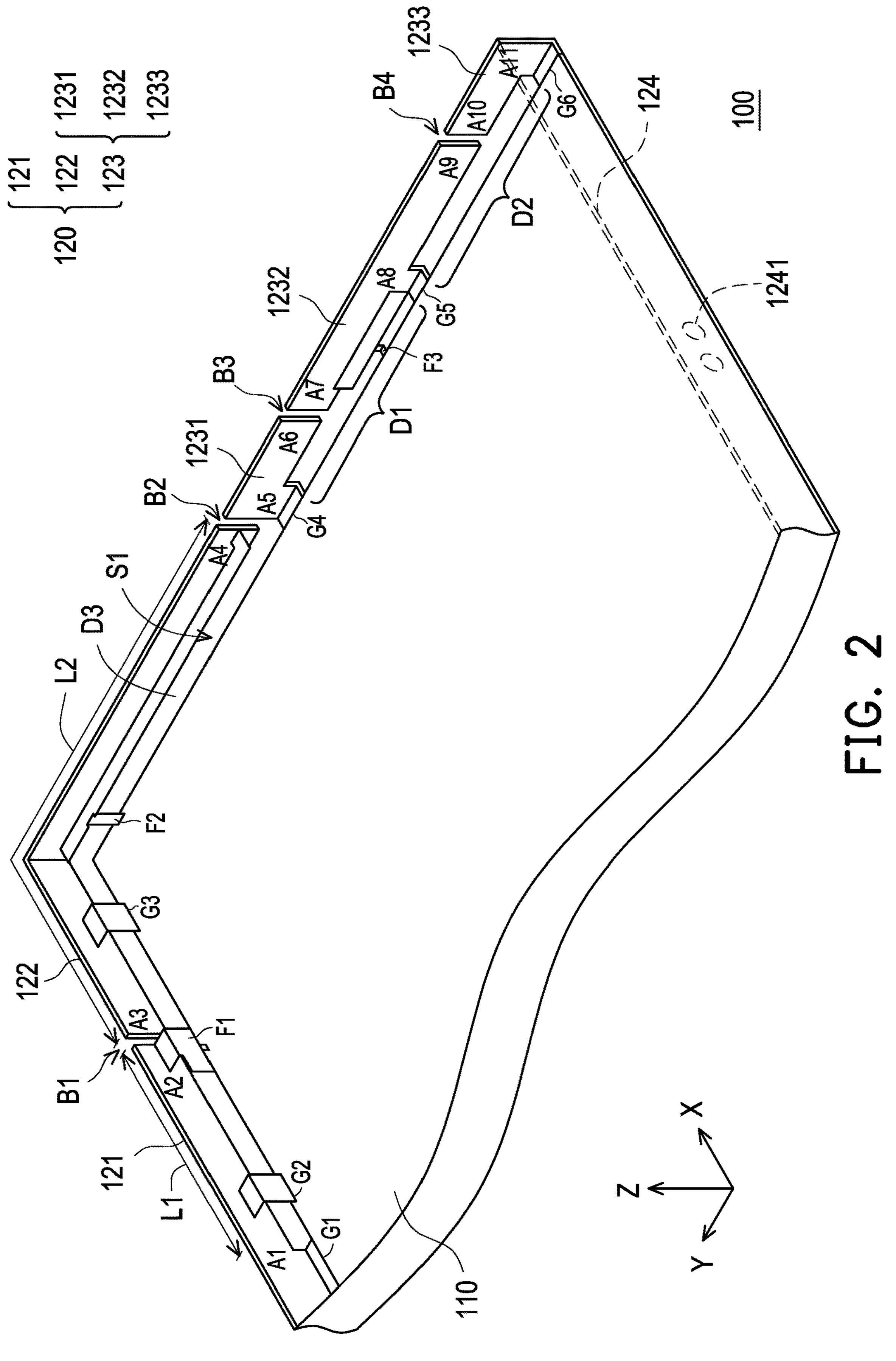
FIG. 2 is a partially enlarged three dimensional diagram of the antenna module in FIG. 1 from another perspective.

FIG. 1 is a three dimensional schematic diagram of an antenna module according to an embodiment of the disclosure. FIG. 2 is a partially enlarged three dimensional diagram of the antenna module in FIG. 1 from another perspective. It should be noted that, FIG. 2 omits the drawing of the second metal plate and filling insulating material for the convenience of illustration. Meanwhile, coordinates X-Y-Z are provided in the figure to facilitate description. Here, the X, Y, and Z axes are perpendicular to each other, but the disclosure is not limited thereto.

Referring to FIG. 1 and FIG. 2, the antenna module 100 of this embodiment includes a first metal plate 110, a second metal plate 130, and a frame body 120. The first metal plate 110 and the second metal plate 130 are opposite to each other, and the frame body 120 is located between the first metal plate 110 and the second metal plate 130. In this embodiment, the antenna module 100 may be applied to a mini PC, but the application of the antenna module 100 is not limited thereto.

In this embodiment, the frame body 120 surrounds the first metal plate 110, the antenna module 100 is divided into two halves by the center line CL, and the antenna structure thereof is symmetrical. For example, the frame body 120 includes a first antenna radiator 121, a second antenna radiator 122, and a third antenna radiator 123. In this embodiment, the frame body 120 is a conductive material, such as metal, but it is not limited thereto.

In this embodiment, the first antenna radiator 121 includes a first feeding end F1. The second antenna radiator 122 includes a second feeding end F2. The third antenna radiator 123 includes a third feeding end F3. In an embodiment, the antenna module 100 further includes multiple circuit boards adapted to be disposed on the first metal plate 110. The first feeding end F1, the second feeding end F2, and the third feeding end F3 are adapted to be connected to corresponding circuit boards for electrical connection to the signal positive end of the coaxial transmission line, the disclosure is not limited thereto.

In this embodiment, the first antenna radiator 121 excites a first frequency band, the second antenna radiator 122 excites a second frequency band, and the third antenna radiator 123 excites a third frequency band.

In detail, in this embodiment, the first antenna radiator 121 further includes a first ground end G1 and a second ground end G2. The first ground end G1 and the second ground end G2 are connected to the first metal plate 110, and the second antenna radiator 122 further includes a third ground end G3 connected to the first metal plate 110. The first ground end G1, the second ground end G2, and the third ground end G3 are integrally formed with corresponding antenna radiators and connected to the system ground plane for electrical connection to the signal negative end of the coaxial transmission line.

In this embodiment, the frame body 120 further includes a first breakpoint B1 and a second breakpoint B2. The first breakpoint B1 is located between the first antenna radiator 121 and the second antenna radiator 122. The first antenna radiator 121 is, for example, WiFi 6E, and the second antenna radiator 122 is, for example, 5G Sub-6 [low frequency (LB)+medium high frequency (MHB)+ultra high frequency (UHB)]. The first antenna radiator 121 is combined with the internal feeder pattern through the metal frame to generate dual-band characteristics of 2400 MHz to 2500 MHz and 5150 MHz to 7125 MHz, but not limited thereto. In this embodiment, the metal frame of the first antenna radiator 121 extends a length L1 from the first breakpoint B1, and the length L1 is, for example, 38 mm, but not limited thereto.

In this embodiment, the second breakpoint B2 is located between the second antenna radiator 122 and the third antenna radiator 123. The third antenna radiator 123 is, for example, global navigation satellite systems (GNSS) [GPS L1]+5G Sub-6 [MHB+UHB]. The second antenna radiator 122 includes two metal side walls perpendicular to each other. The second antenna radiator 122 forms an inverted L-shaped metal frame, and is combined with the internal feeder pattern through the inverted L-shaped metal frame to generate multiple broadband characteristics of 617 MHz to 960 MHz, 1710 MHz to 2690 MHZ, and 3300 MHz to 5000 MHz, but not limited thereto. In this embodiment, the length L2 of the metal frame of the second antenna radiator 122 is, for example, 92.5 mm, but not limited thereto.

Further, in this embodiment, the third antenna radiator 123 has a first part 1231, a second part 1232, and a third part 1233 arranged in sequence. The third antenna radiator 123 further includes a fourth ground end G4, a fifth ground end G5, and a sixth ground end G6 connected to the first metal plate 110. The fourth ground end G4, the fifth ground end G5, and the sixth ground end G6 are respectively connected to the first part 1231, the second part 1232 and the third part 1233. The fourth ground end G4, the fifth ground end G5, and the sixth ground end G6 are integrally formed with the corresponding antenna radiator and connected to the system ground plane for electrical connection to the signal negative end of the coaxial transmission line.

In this embodiment, the frame body 120 further includes a third breakpoint B3 and a fourth breakpoint B4, and includes a metal side plate 124. The metal side plate 124 includes an input/output port (I/O port) 1241, the form, quantity and configuration of the input/output port 1241 may be determined according to actual requirements, and the disclosure is not limited thereto.

In this embodiment, the third breakpoint B3 and the fourth breakpoint B4 are located between the third antenna radiator 123 and the metal side plate 124. Specifically, the third breakpoint B3 is located between the first part 1231 and the second part 1232, and the fourth breakpoint B4 is located between the second part 1232 and the third part 1233, but the disclosure is not limited thereto.

In this embodiment, there is a first slot S1 between the connection of the frame body 120 and the first metal plate 110. In this embodiment, the first slot S1 connects the first breakpoint B1, the second breakpoint B2, the third breakpoint B3, and the fourth breakpoint B4. The first slot S1 and the first breakpoint B1, the second breakpoint B2, the third breakpoint B3, and the fourth breakpoint B4 are all filled with an insulating material 140 such as plastic, but the disclosure is not limited thereto.

In this embodiment, the first slot S1 has a first slot segment D1 and a second slot segment D2. The first slot segment D1 is located between the fourth ground end G4 and the fifth ground end G5. The second slot segment D2 is located between the fifth ground end G5 and the sixth ground end G6. The first slot segment D1 extends along the Y axis and communicates with the third breakpoint B3 to form an inverted T-shaped slot, and the second slot segment D2 extends along the Y axis and communicates with the fourth breakpoint B4 to form an inverted T-shaped slot, but the disclosure is not limited thereto. In this embodiment, the first slot S1 also has a third slot segment D3 located between the first ground end G1 and the fourth ground end G4, and the third slot segment D3 communicates with the first breakpoint B1 and is L-shaped, but the disclosure is not limited thereto.

In this embodiment, the third antenna radiator 123 is combined with the internal feeder pattern through the metal frame with the inverted T-shaped slots that the third breakpoint B3 and the fourth breakpoint B4 are placed in to generate multiple broadband characteristics of 1565 MHz to 1625 MHz, 1710 MHz to 2690 MHz, and 3300 MHz to 5000 MHz, but not limited thereto.

Under the above arrangement, the first antenna radiator 121, the second antenna radiator 122, and the third antenna radiator 123 are arranged in sequence to form a set of L-shaped frames. In this embodiment, the antenna module 100 generates a characteristic of a metal casing with a high metal ratio through the first metal plate 110, the second metal plate 130, and two sets of left and right mirrored L-shaped frames. The touch and luster of the metal casing may enhance the texture of the product, which achieves an innovative and beautiful appearance under industrial design, and achieves the advantage of being thinner and lighter.

In this embodiment, a set of inverted L-shaped metal frame has four breakpoints and multi-antenna feeders. Its shape may be triangular, circular or rectangular with different surface textures to achieve a three-dimensional all-metal casing and maintain integrity of appearance; one or two sets of L-shaped frames are planned according to the system, which is not limited by the disclosure. For example, two sets of L-shaped frames may achieve the spatial configuration of 5G Sub-6 4×4 MIMO and WiFi 6E 2×2 MIMO multi-antenna, which may effectively improve the spectrum efficiency of the wireless communication system, to increase the transmission rate and improve the communication quality; furthermore, the beam forming technology may be introduced into the 4×4 MIMO multi-antenna so that the coverage and angle of wireless transmission are wider.

The following describes the design of the antenna architecture in detail.

In this embodiment, the first antenna radiator 121 extends upward from the feeder pattern of the first feeding end F1 along the Z axis, turns to vertically connect to the position A2, and connects to the first metal plate 110 by forming a first loop through the first feeding end F1, the positions A2 and A1, and the first ground end G1. The first antenna radiator 121 forms a second loop through the first feeding end F1, the positions A2 and A1, and the second ground end G2 to increase the impedance matching bandwidth of the antenna.

In this embodiment, the second antenna radiator 122 extends upward from the feeder pattern of the second feeding end F2 along the Z axis, turns to vertically connect to the position A4, and connects to the first metal plate 110 through the position A3 and the third ground end G3. Here, the corner of the metal frame of the second antenna radiator 122 may be appropriately adjusted to find the best effect of antenna impedance matching.

In this embodiment, the third antenna radiator 123 extends upward from the feeder pattern of the third feeding end F3 along the Z axis and is coupled to the T-shaped side wall metal frame at the path of positions A7, A8, and A9, and then connects to the first metal plate 110 through the path of the position A8 and the fifth ground end G5. Next, the path of positions A6, A5, and the fourth ground end G4 and the path of positions A10, A11 and the sixth ground end G6 are combined (i.e., the double inverted T-shaped slots respectively formed by the third breakpoint B3 and the fourth breakpoint B4 with the first slot S1), so that the third antenna radiator 123 generates broadband antenna characteristics.

Figure 3:
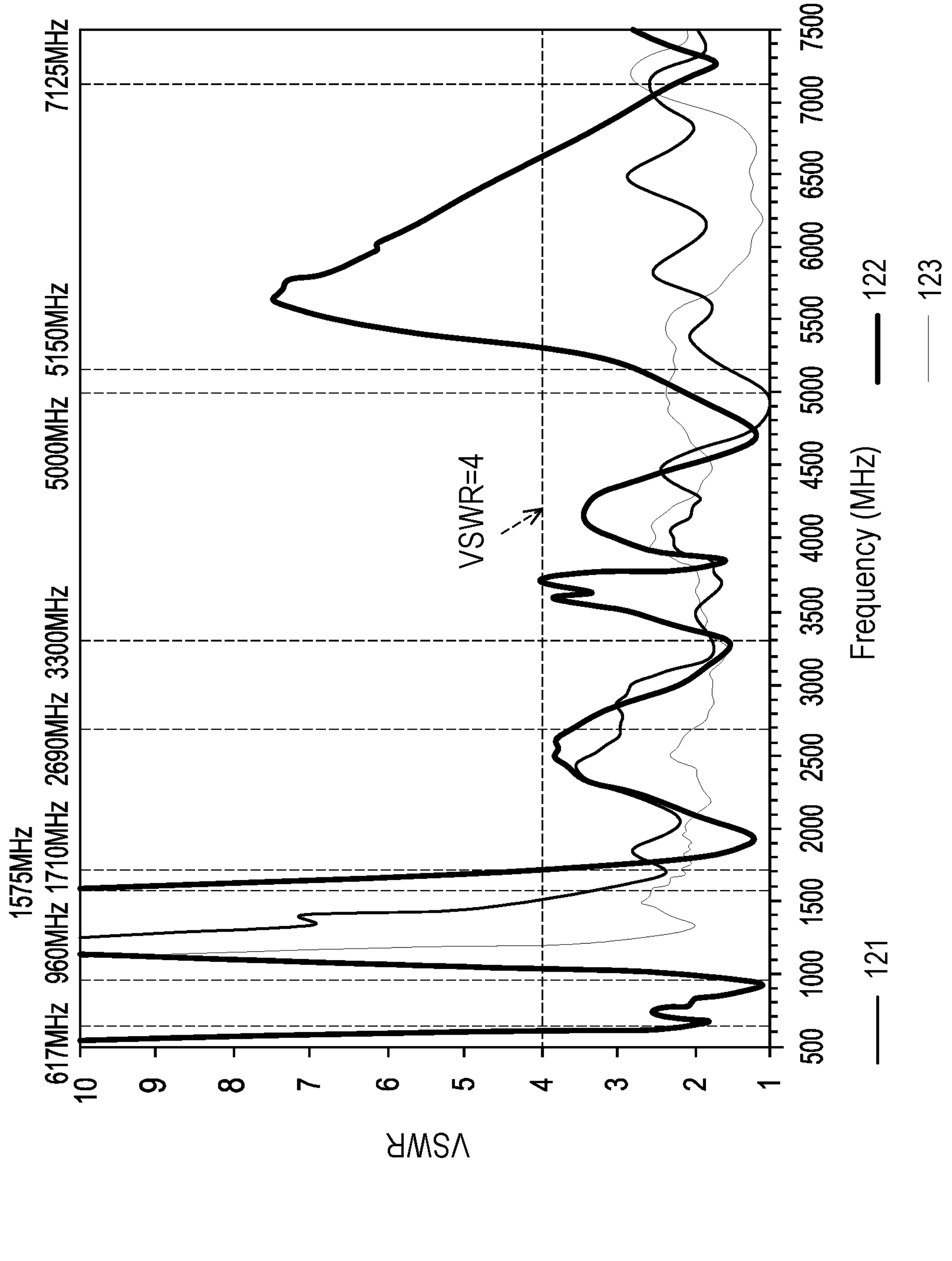
FIG. 3 is a frequency-VSWR relationship diagram of multiple antennas of the antenna module of FIG. 2.
Figure 4:
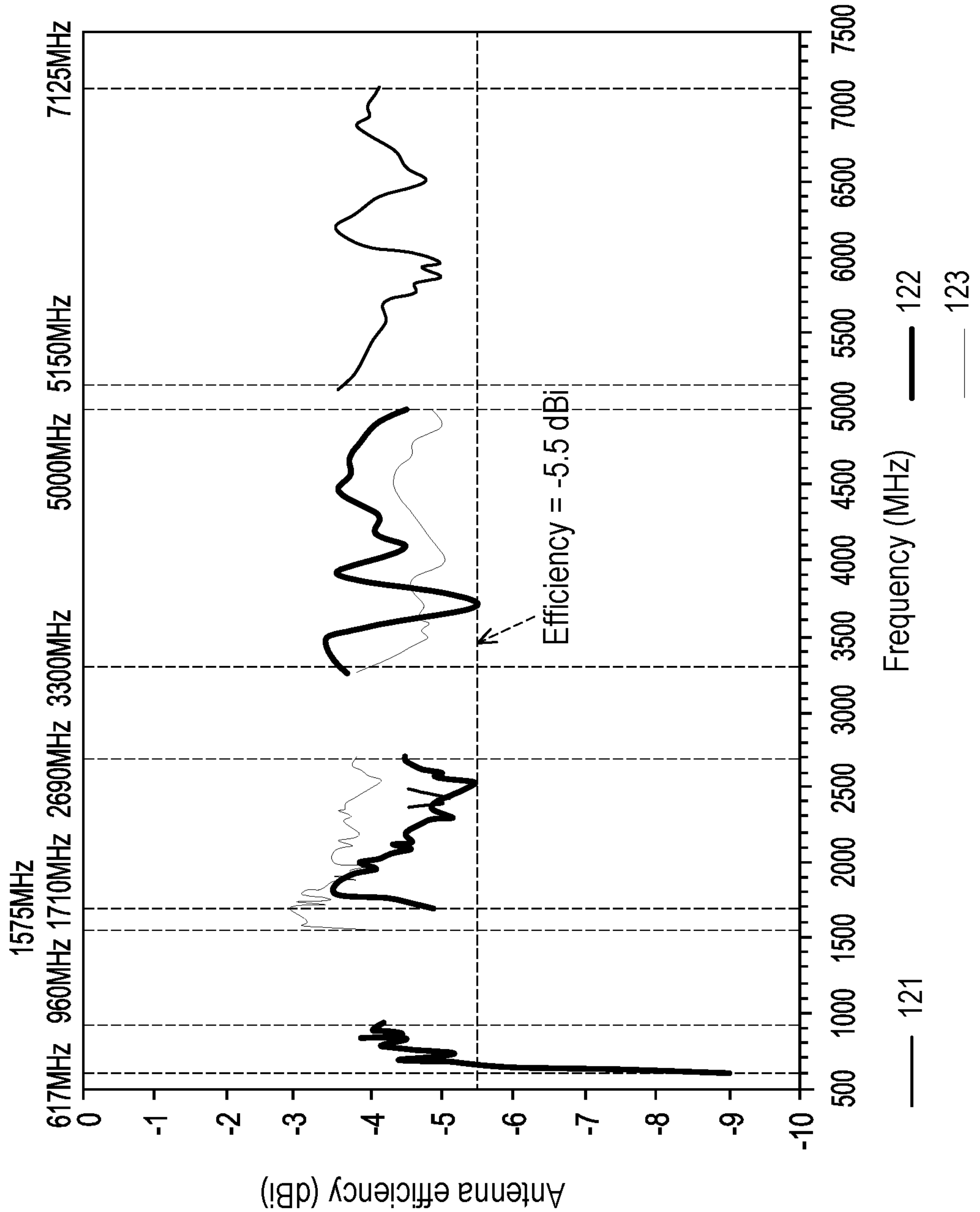
FIG. 4 is a frequency-antenna efficiency relationship diagram of multiple antennas of the antenna module of FIG. 2.

FIG. 3 is a frequency-VSWR relationship diagram of multiple antennas of the antenna module of FIG. 2. FIG. 4 is a frequency-antenna efficiency relationship diagram of multiple antennas of the antenna module of FIG. 2. Referring to FIG. 3 first, the voltage standing wave ratio (VSWR) of the multi-antenna design of the combined metal frame of this embodiment may be less than 4. Referring to FIG. 4, the low frequency 617 to 960 MHz is −3.9 to −9.0 dBi, the medium high frequency 1710 to 2690 MHz is −2.9 to −5.5 dBi, and the ultra high frequency 3300 to 5000 MHz is −3.4 to −5.5 dBi. In this embodiment, the antenna efficiency of WiFi 6E at 2.4 GHz (frequency 2400 to 2500 MHz) is −4.5 to −5.1 dBi, while the antenna efficiency of WiFi 6E at 5 GHz & 6 GHz (frequency 5150 to 7125 MHz) is −3.5 to −5.0 dBi. This demonstrates good antenna efficiency performance, but the disclosure is not limited thereto.

Other embodiments are described below for illustrative purposes. It is to be noted that the following embodiments use the reference numerals and a part of the contents of the above embodiments, and the same reference numerals are used to denote the same or similar elements, and the description of the same technical contents is omitted. For the description of the omitted part, reference may be made to the above embodiments, and details are not described in the following embodiments.

Figure 5A:
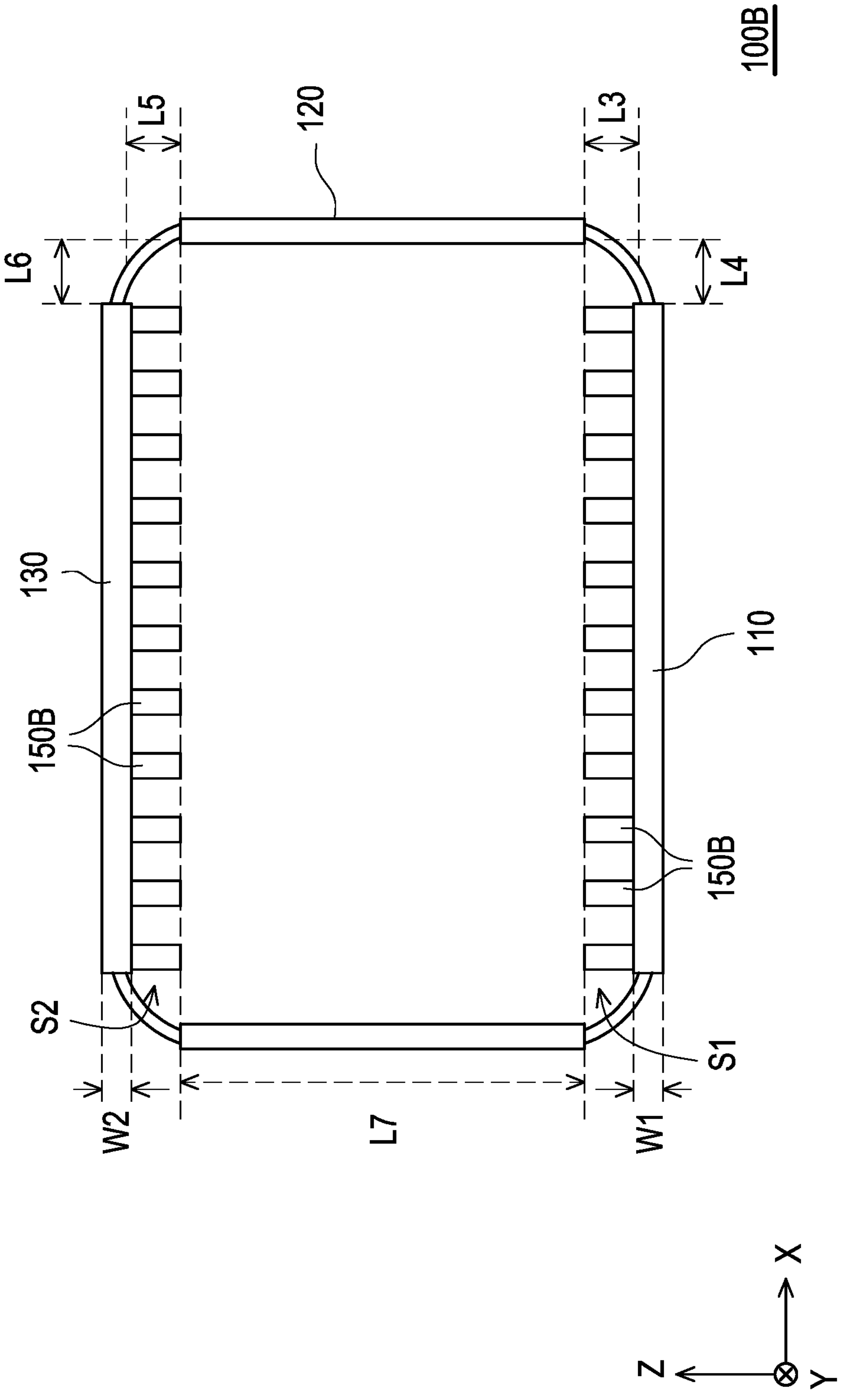
FIG. 5A and FIG. 5B are a side schematic diagram and a top schematic diagram of the antenna module of an embodiment of the disclosure.
Figure 5B:
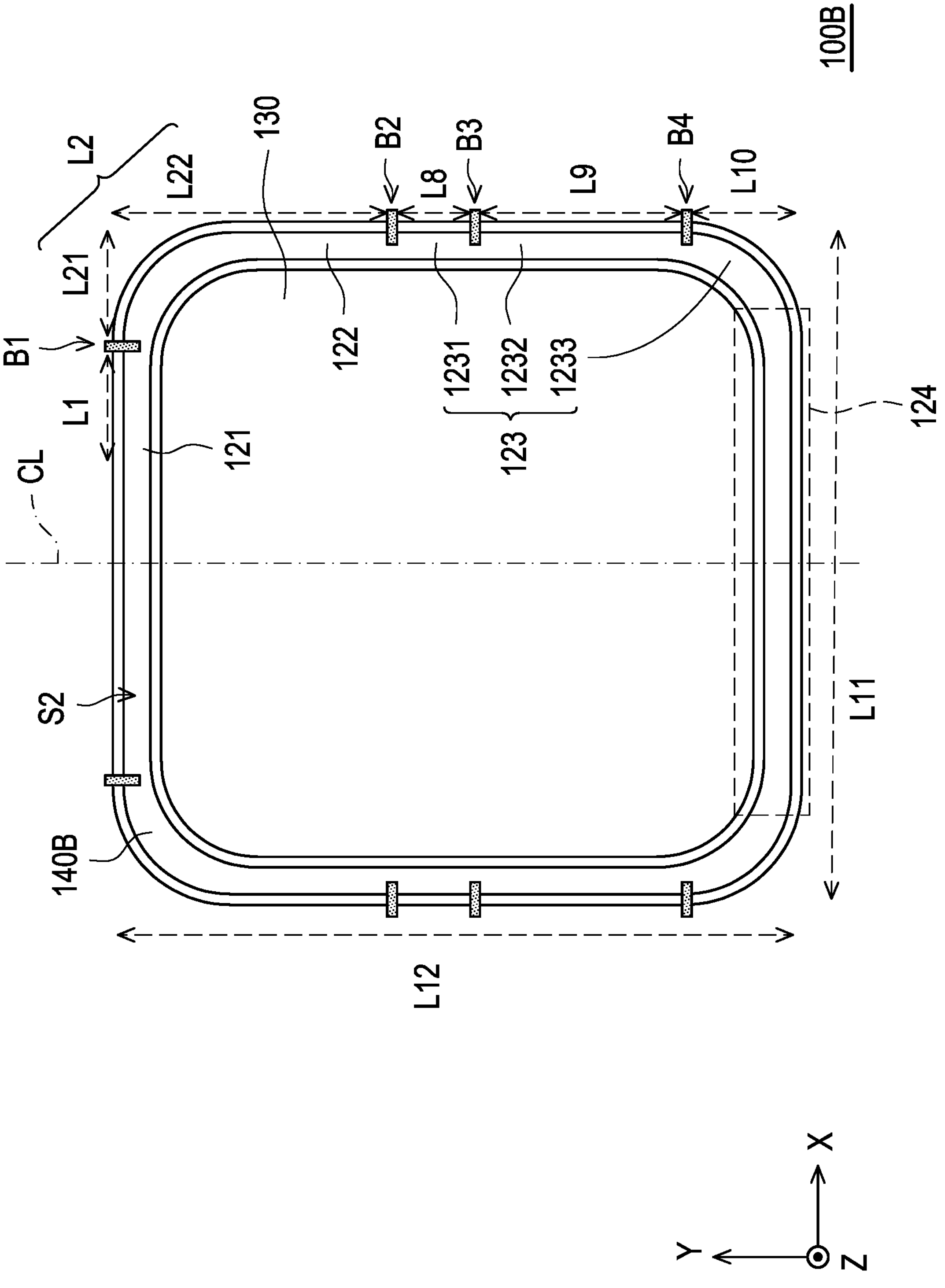

FIG. 5A and FIG. 5B are a side schematic diagram and a top schematic diagram of the antenna module of an embodiment of the disclosure. It should be noted first that the antenna modules shown in FIG. 5A and FIG. 5B only schematically and briefly show the relative positions of the components for the convenience of illustration. Meanwhile, coordinates X-Y-Z are provided in the figure to facilitate description. Here, the X, Y, and Z axes are perpendicular to each other, but the disclosure is not limited thereto.

Referring to FIG. 5A and FIG. 5B, in this embodiment, the antenna module 100B has multiple heat dissipation holes 150B, which are located between the first metal plate 110 and the frame body 120 and between the second metal plate 130 and the frame body 120. For example, they may be located on the insulating material filled between the first metal plate 110 and the frame body 120 and between the second metal plate 130 and the frame body 120.

In this embodiment, a second slot S2 is between the frame body 120 and the second metal plate 130. The lengths L3 and L4 of the first slot S1 are, for example, 2 mm, and the lengths L5 and L6 of the second slot S2 are, for example, 2 mm, but the disclosure is not limited thereto. In the X-Z cross-sectional diagram, the four corners of the antenna module 100B have slots of 2 mm when viewed from the X or Z axis, but the disclosure is not limited thereto.

In this embodiment, the length L7 of the frame body 120 in the Z axis direction is, for example, 6.4 mm, but the disclosure is not limited thereto. In this embodiment, the feeding pattern and the grounding pattern of the antenna structure are respectively connected to the middle of the length L7 of the frame body 120, so that they respectively have a height of 3.2 mm+2 mm=5.2 mm from the first metal plate 110 and the second metal plate 130, but the disclosure is not limited thereto.

Furthermore, the antenna module 100B of this embodiment utilizes an insulating material, such as plastic, to form a plastic slot edge strip 140B through injection molding, and integrates the heat dissipation holes 150B, such that it has a visually minimized appearance in the X-Z cross-section of the all-metal casing. The plastic slot edge strip 140B, with a sufficiently large antenna radiation hole size (e.g., 2 mm), integrates the heat dissipation holes 150B to achieve the function of heat dissipation and ventilation, thereby possessing the advantage of concealed heat dissipation holes. Such a design, together with the first metal plate 110 and the second metal plate 130, may dissipate the internal heat source and greatly improve the problem of local hot spots caused by thinning.

Regarding the size design of the antenna module 100B, the length L1 of the first antenna radiator 121 is, for example, 38 mm. The length L21 of the second antenna radiator 122 is, for example, 31 mm, the length L22 is, for example, 61.5 mm, and the total length L2 thereof is, for example, 92.5 mm. The lengths L8, L9, and L10 of the first part 1231, the second part 1232, and the third part 1233 of the third antenna radiator 123 are, for example, 17.5 mm, 48.5 mm, and 17.5 mm. The length L11 of the antenna module 100B in the X axis direction is, for example, 196 mm, and the length L12 of the antenna module 100B in the Y axis direction is, for example, 151 mm, but not limited thereto. The thicknesses W1 and W2 of the first metal plate 110 and the second metal plate 130 are, for example, 0.8 mm, so that the total length of the antenna module 100B in the Z axis direction is 12 mm, but not limited thereto. The first breakpoint B1, the second breakpoint B2, the third breakpoint B3, and the fourth breakpoint B4 are, for example, a 2 mm wide breaking knife gap, but not limited thereto.

In the above embodiments, the antenna module 100 is applied to a mini PC, but in other embodiments, the multi-antenna design may also be applied to other electronic devices.

Figure 6:
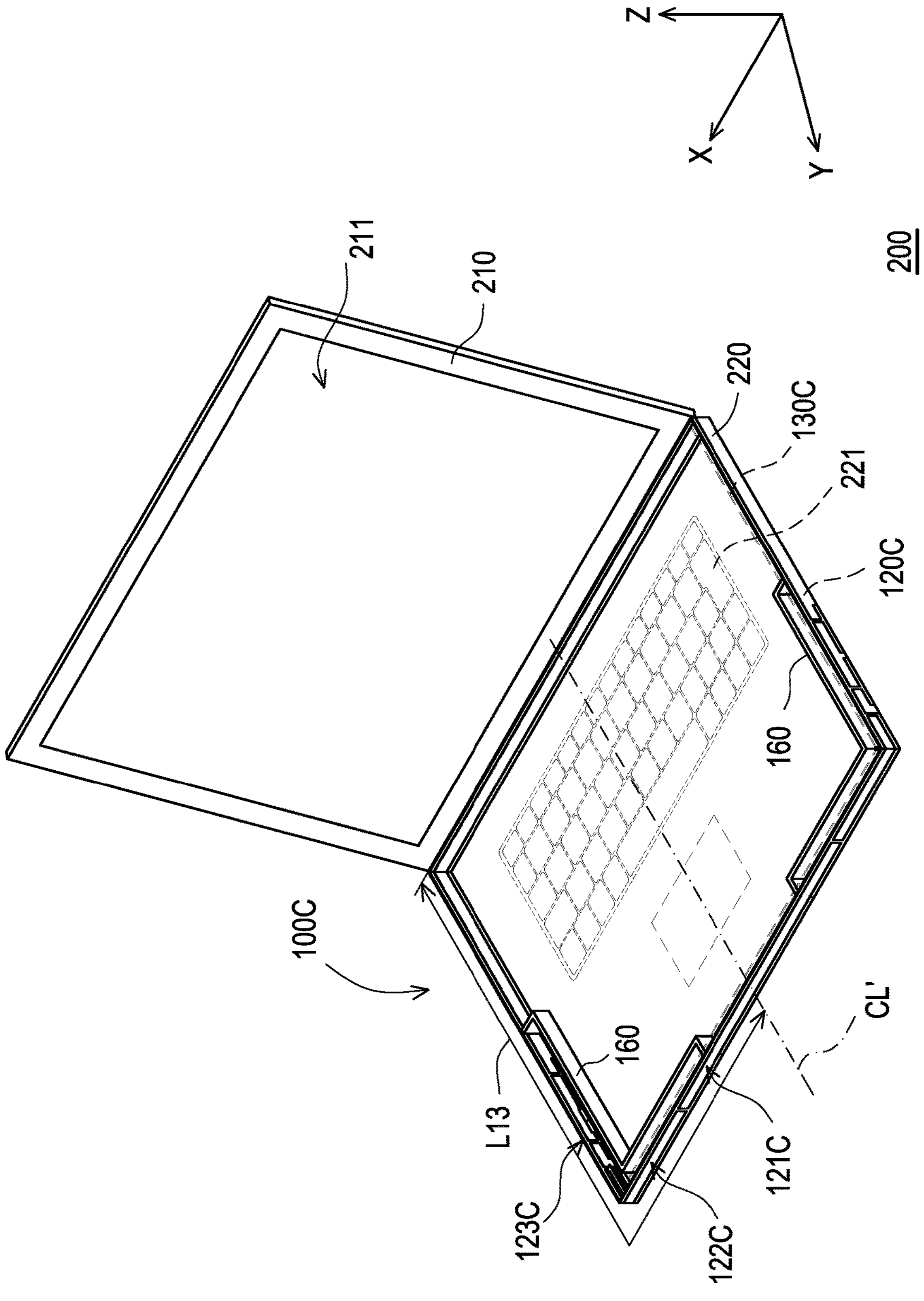
FIG. 6 is a three dimensional schematic diagram of an electronic device according to an embodiment of the disclosure.

FIG. 6 is a three dimensional schematic diagram of an electronic device according to an embodiment of the disclosure. Referring to FIG. 6, in this embodiment, the electronic device 200 is, for example, a laptop, and includes a first body 210, a second body 220, and an antenna module 100C. The first body 210 includes a screen 211. The second body 220 includes an input module 221.

In this embodiment, the antenna module 100C is disposed on the second body 220, the first metal plate 110C serves as the bottom surface of the second body 220, the second metal plate 130C serves as the top surface of the second body 220, and the input module 221 includes a keyboard and a touch pad, and is disposed on the second metal plate 130C, but the disclosure is not limited thereto.

In detail, in this embodiment, the frame body 120C of the antenna module 100C serves as the side wall metal frame of the second body 220, and the total metal frame length L13 of a set of L-shaped frames (including the first antenna radiator 121C, the second antenna radiator 122C, and the third antenna radiator 123C) may be adjusted according to actual requirements, for example, within 222 mm. With the center line CL' as the center, the mirrored L-shaped frame and multiple breakpoints on the metal frame have the same performance as the above-mentioned mini PC with its multi-antenna integrated metal frame design.

In addition, in this embodiment, the antenna module 100C further includes a metal retaining wall structure 160, and the metal retaining wall structure 160 is located between the first metal plate 110C and the second metal plate 130C. For example, the metal retaining wall structure 160 extends along the extending direction of the first antenna radiator 121C, the second antenna radiator 122C and the third antenna radiator 123C, and maintains a distance from the first antenna radiator 121C, the second antenna radiator 122C and the third antenna radiator 123C. The metal retaining wall structure 160 may be, for example, 5 mm away from opposite ends of the L-shaped frame, so that the first metal plate 110C and the second metal plate 130C have a complete system grounding effect. In this way, the metal retaining wall structure 160 has the ability to block the interference of noise sources and effectively increase the wireless transmission rate.

To sum up, in the antenna module of the disclosure, under the condition of combining the metal frame with multiple breakpoints, in conjunction with an environment covered with top and bottom metals, its 5G Sub-6 antenna may support multi-band antenna characteristics, including low frequency (617 to 960 MHz), GPS (1565 to 1625 MHz), medium high frequency (1710 to 2690 MHz), ultra high frequency (3300 to 5000 MHz), and LAA (5150 to 5850 MHz). Simultaneously, it may appropriately select and match the switching circuit mechanism to individually enhance the antenna performance of different frequency bands. While the WiFi 6E antenna may support multi-band antenna characteristics, including WiFi 2.4G (2400 to 2500 MHz), WiFi 5G (5150 to 5850 MHz), and WiFi 6E (5925 to 7125 MHz), so that the antenna module has multiple multi-band antennas at the same time.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An antenna module, comprising:

a first metal plate; and a frame body, surrounding the first metal plate, and the frame body comprising:

a first antenna radiator, comprising a first feeding end, a first ground end, and a second ground end, and exciting a first frequency band, wherein the first ground end and the second ground end are connected to the first metal plate;

a second antenna radiator, comprising a second feeding end and a third ground end, and exciting a second frequency band, wherein the third ground end is connected to the first metal plate;

a third antenna radiator, having a first part, a second part, and a third part, the third antenna radiator further comprising a third feeding end, a fourth ground end, a fifth ground end, and a sixth ground end, and exciting a third frequency band, wherein the fourth ground end, the fifth ground end, and the sixth ground end are connected to the first metal plate and are respectively connected to the first part, the second part, and the third part;

a first breakpoint, located between the first antenna radiator and the second antenna radiator;

a second breakpoint, located between the second antenna radiator and the third antenna radiator;

a third breakpoint, located between the first part and the second part; and a fourth breakpoint, located between the second part and the third part, wherein a first slot is between the frame body and the first metal plate, wherein the first slot has a first slot segment located between the fourth ground end and the fifth ground end and a second slot segment located between the fifth ground end and the sixth ground end, the first slot segment communicates with the third breakpoint, and the second slot segment communicates with the fourth breakpoint, and wherein the first slot further has a third slot segment located between the first ground end and the fourth ground end, and the third slot segment communicates with the first breakpoint.

2. The antenna module according to claim 1, wherein the first slot communicates with the first breakpoint, the second breakpoint, the third breakpoint, and the fourth breakpoint.

3. The antenna module according to claim 2, wherein the first slot and the first breakpoint, the second breakpoint, the third breakpoint, and the fourth breakpoint are all filled with an insulating material.

4. The antenna module according to claim 3, further comprising a plurality of heat dissipation holes, wherein the heat dissipation holes are disposed at the insulating material in the first slot.

5. The antenna module according to claim 2, wherein the second slot segment communicates with the fourth breakpoint to form two inverted T-shaped slots.

6. The antenna module according to claim 1, wherein the first antenna radiator, the second antenna radiator, and the third antenna radiator are arranged in sequence to form an L-shaped frame.

7. The antenna module according to claim 1, further comprising a second metal plate, wherein the frame body is located between the first metal plate and the second metal plate, and a second slot is between the second metal plate and the frame body.

8. The antenna module according to claim 7, further comprising a metal retaining wall structure, wherein the metal retaining wall structure is located between the first metal plate and the second metal plate, extends along an extending direction of the first antenna radiator, the second antenna radiator, and the third antenna radiator, and maintains a distance from the first antenna radiator, the second antenna radiator, and the third antenna radiator.

9. An electronic device, comprising:

a first body, comprising a screen a second body, comprising an input module; and an antenna module, disposed in the second body, the antenna module comprising:

a first metal plate; and a frame body, surrounding the first metal plate, and the frame body comprising:

a first antenna radiator, comprising a first feeding end, a first ground end, and a second ground end, and exciting a first frequency band, wherein the first ground end and the second ground end are connected to the first metal plate;

a second antenna radiator, comprising a second feeding end and a third ground end, and exciting a second frequency band, wherein the third ground end is connected to the first metal plate;

a third antenna radiator, having a first part, a second part, and a third part, the third antenna radiator further comprising a third feeding end, a fourth ground end, a fifth ground end, and a sixth ground end, and exciting a third frequency band, wherein the fourth ground end, the fifth ground end, and the sixth ground end are connected to the first metal plate and are respectively connected to the first part, the second part, and the third part;

a first breakpoint, located between the first antenna radiator and the second antenna radiator;

a second breakpoint, located between the second antenna radiator and the third antenna radiator;

a third breakpoint, located between the first part and the second part; and a fourth breakpoint, located between the second part and the third part, wherein a first slot is between the frame body and the first metal plate, wherein the first slot has a first slot segment located between the fourth ground end and the fifth ground end and a second slot segment located between the fifth ground end and the sixth ground end, the first slot segment communicates with the third breakpoint, and the second slot segment communicates with the fourth breakpoint, and wherein the first slot further has a third slot segment located between the first ground end and the fourth ground end, and the third slot segment communicates with the first breakpoint.

10. The electronic device according to claim 9, wherein the first slot communicates with the first breakpoint, the second breakpoint, the third breakpoint, and the fourth breakpoint.

11. The electronic device according to claim 10, wherein the first slot and the first breakpoint, the second breakpoint, the third breakpoint, and the fourth breakpoint are all filled with an insulating material.

12. The electronic device according to claim 11, wherein the antenna module further comprising a plurality of heat dissipation holes, wherein the heat dissipation holes are disposed at the insulating material in the first slot.

13. The electronic device according to claim 10, wherein the second slot segment communicates with the fourth breakpoint to form two inverted T-shaped slots.

14. An electronic device, comprising:

a first body, comprising a screen a second body, comprising an input module; and an antenna module, disposed in the second body, the antenna module comprising:

a first metal plate; and a frame body, surrounding the first metal plate, and the frame body comprising:

a first antenna radiator, comprising a first feeding end, a first ground end, and a second ground end, and exciting a first frequency band, wherein the first ground end and the second ground end are connected to the first metal plate;

a second antenna radiator, comprising a second feeding end and a third ground end, and exciting a second frequency band, wherein the third ground end is connected to the first metal plate;

a third antenna radiator, having a first part, a second part, and a third part, the third antenna radiator further comprising a third feeding end, a fourth ground end, a fifth ground end, and a sixth ground end, and exciting a third frequency band, wherein the fourth ground end, the fifth ground end, and the sixth ground end are connected to the first metal plate and are respectively connected to the first part, the second part, and the third part;

a first breakpoint, located between the first antenna radiator and the second antenna radiator;

a second breakpoint, located between the second antenna radiator and the third antenna radiator;

a third breakpoint, located between the first part and the second part;

a fourth breakpoint, located between the second part and the third part; and a second metal plate, wherein the frame body is located between the first metal plate and the second metal plate, and a second slot is between the second metal plate and the frame body, wherein the input module is disposed on the second metal plate, wherein a first slot is between the frame body and the first metal plate, wherein the first slot has a first slot segment located between the fourth ground end and the fifth ground end and a second slot segment located between the fifth ground end and the sixth ground end, the first slot segment communicates with the third breakpoint, and the second slot segment communicates with the fourth breakpoint, and wherein the first slot further has a third slot segment located between the first ground end and the fourth ground end, and the third slot segment communicates with the first breakpoint.

* * * * *